United States Patent
Moser

(10) Patent No.: US 11,023,227 B2
(45) Date of Patent: Jun. 1, 2021

(54) TIME-DEPENDENT ACTIVATION OF CONFIGURATION CONTENT

(71) Applicant: SAP SE, Walldorf (DE)

(72) Inventor: Martin Moser, Speyer (DE)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 16/552,059

(22) Filed: Aug. 27, 2019

(65) Prior Publication Data

US 2021/0064360 A1 Mar. 4, 2021

(51) Int. Cl.
*G06F 8/71* (2018.01)
*G06F 9/54* (2006.01)
*G06F 8/77* (2018.01)
*G06F 8/65* (2018.01)

(52) U.S. Cl.
CPC ............... *G06F 8/71* (2013.01); *G06F 8/65* (2013.01); *G06F 8/77* (2013.01); *G06F 9/541* (2013.01)

(58) Field of Classification Search
CPC ..... G06F 8/65; G06F 8/71; G06F 8/77; G06F 9/541
See application file for complete search history.

(56) References Cited

U.S. PATENT DOCUMENTS

| | | | | |
|---|---|---|---|---|
| 6,978,281 B1* | 12/2005 | Kruy | ............... | G06F 8/71 |
| 2004/0168153 A1* | 8/2004 | Marvin | ............... | G06F 8/71 |
| | | | | 717/120 |
| 2005/0187983 A1* | 8/2005 | Narang | ............... | G06F 16/2477 |
| 2010/0299663 A1* | 11/2010 | Weissman | ............... | G06F 8/71 |
| | | | | 717/170 |
| 2019/0065327 A1* | 2/2019 | Wei | ............... | G06F 11/1451 |

OTHER PUBLICATIONS

External Configuration Store pattern: Cloud Design Patterns | Microsoft Docs from the Internet: https://docs.microsoft.com/en-us/azure/architecture/patterns/external-configuration-store Oct. 23, 2020.
Mitra: Microservices and Spring Cloud Config Server; Microservice Zone Tutorial Jul. 5, 2017.

* cited by examiner

*Primary Examiner* — S. Sough
*Assistant Examiner* — Stephen D Berman
(74) *Attorney, Agent, or Firm* — Buckley, Maschoff & Talwalkar LLC

(57) ABSTRACT

Provided is a system and method for time-dependent activation of configuration content for a software application or service in a distributed computing environment. In one example, the method may include receiving a request associated with a software application, reading version information of a configuration object of the software application, the version information comprising different versions corresponding to different configuration content of the configuration object, identifying a currently active version of the configuration object from among the different versions based on activation identifiers of the different versions, and retrieving configuration content corresponding to the currently active version of the configuration object.

22 Claims, 8 Drawing Sheets

500

FIG. 2A
200 
| Version | Name | Active From |
|---|---|---|
| ... | ... | ... |
| 1.0.0 | Countries | 1.1.2019 00:00:00 |
| 1.0.1 | Countries | 15.5.2019 00:00:00 |
| 1.0.0 | Currencies | 1.1.2019 00:00:00 |
| 2.0.0 | Currencies | 31.8.2019 12:00:00 |
| 2.0.0 | Pricing | 1.1.2019 00:00:00 |
| 2.1.0 | Pricing | 1.7.2019 14:30:00 |
202 — Version
206 — Name
208 — Active From
Today is July 2, 2019 @ 2pm.
The following configurations are active:
210 
| Version | Name | Active From |
|---|---|---|
| 1.0.1 | Countries | 15.5.2019 00:00:00 |
| 1.0.0 | Currencies | 1.1.2019 00:00:00 |
| 2.1.0 | Pricing | 1.7.2019 14:30:00 |

FIG. 2B

Activation Table (220)

| Version (222) | Name (226) | Active From (228) |
|---|---|---|
| ... | ... | ... |
| 1.0.1 | Sales Channel | 1.7.2018 00:00:00 |
| 1.1.0 | Sales Channel | 1.5.2019 00:00:00 |
| 1.0.0 | Currencies | 1.1.2019 00:00:00 |
| 2.0.0 | Currencies | 31.8.2019 12:00:00 |
| 2.0.0 | Pricing | 1.1.2019 00:00:00 |
| 2.1.0 | Pricing | 1.7.2019 14:30:00 |

Activation Table 2 (230)

| Version (232) | Sales Channel |
|---|---|
| 1.0.1 | Personnel Selling |
| 1.0.1 | Retail |
| 1.0.1 | Direct Marketing |
| 1.1.0 | Personnel Selling |
| 1.1.0 | Retail |
| 1.1.0 | Direct Marketing |
| 1.1.0 | eCommerce |

(Rows with version 1.1.0 marked as Active)

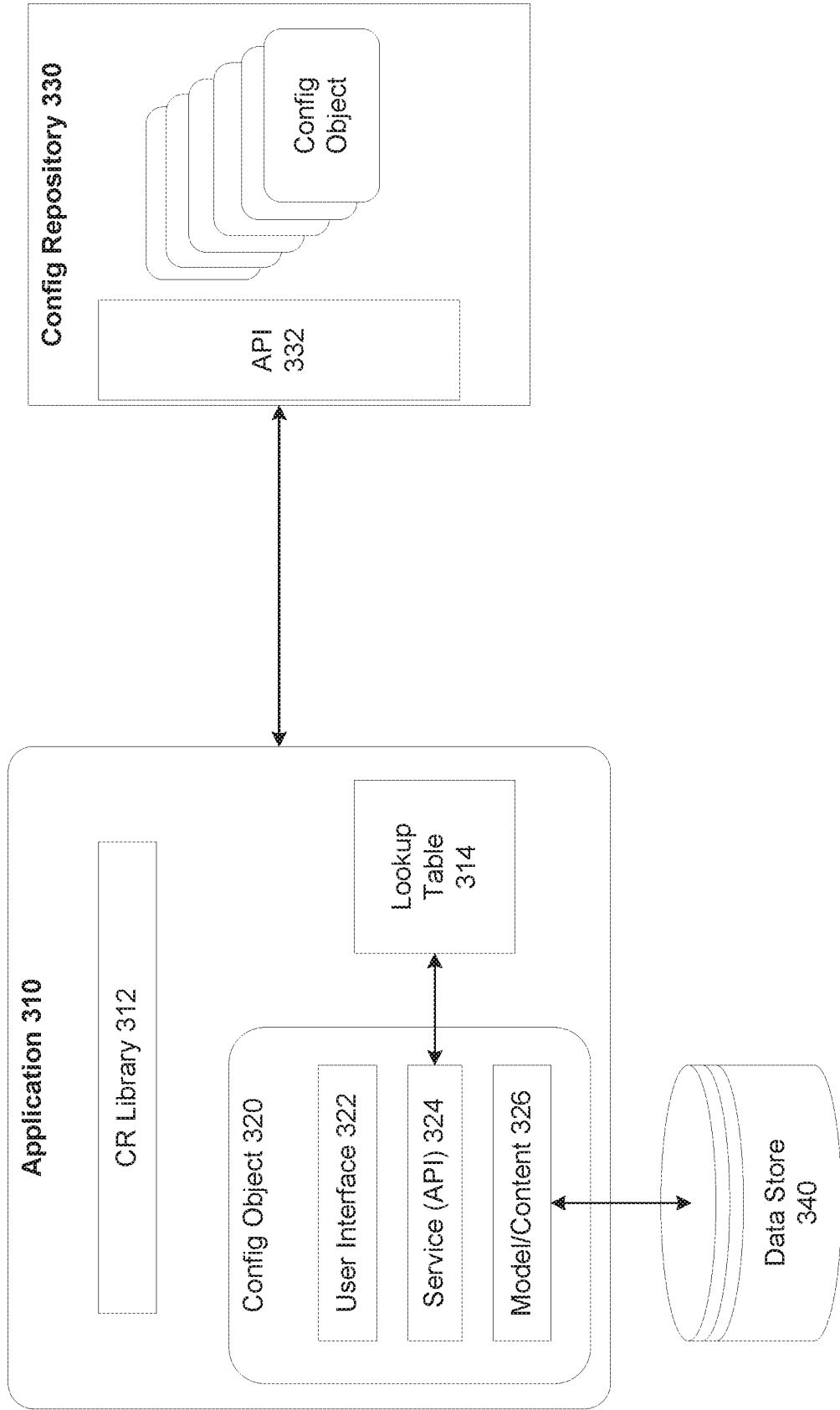

FIG. 4

| Version | Valid From | Valid To | Local Value | Rebate | Description |
|---|---|---|---|---|---|
| ... | ... | ... | ... | ... | ... |
| 1.0.0 | 1.1.2017 | 30.6.2017 | Laptop | 10 | Standard |
| 1.0.0 | 1.1.2017 | 31.12.2017 | Monitor | 8 | Standard |
| 1.0.0 | 1.7.2017 | 31.12.2017 | Laptop | 25 | Clearance Sale |
| 2.0.0 | 1.1.2018 | 31.5.2018 | Laptop | 10 | Standard |
| 2.0.0 | 1.6.2018 | 31.8.2018 | Laptop | 50 | Summer Sale |
| 2.0.0 | 1.1.2018 | 31.8.2018 | Monitor | 15 | Standard |
| 2.1.0 | 1.9.2018 | 31.12.2018 | Laptop | 10 | Standard |
| 2.1.0 | 1.9.2018 | 31.12.2018 | Monitor | 30 | Production Shortage |

TIME-DEPENDENT ACTIVATION OF CONFIGURATION CONTENT

BACKGROUND

In a monolithic software application, all processes are tightly coupled and run as a single service. If one process experiences a spike in demand, the entire architecture must be scaled. Adding or improving the features of a monolithic application becomes more complex as the code base grows. This complexity limits experimentation and makes it difficult to implement new ideas. In addition, monolithic architectures increase the risk of application unavailability because the dependent and tightly-coupled processes increase the impact of a single process failure.

Meanwhile, in a microservices architecture, an application is broken up and each application process is run as its own microservice (or service). The microservices architecture is commonly employed by cloud computing environments. Each microservice may be built for a specific business capability or function. Because they are independent, each microservice can be updated, deployed, and scaled to meet demand for specific functions of an application. However, in a microservices architecture, modifying application content requires each individual microservice to be updated to reflect the modification. In this scenario, the microservices are typically configured asynchronously (e.g., round-robin, etc.) This can result in situations where one microservice is operating with different business content than another, leading to errors.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIGS. 2A-2B are diagrams illustrating activation information for configuration content in accordance with an example embodiment.

FIG. 3 is a diagram illustrating a process of a software artifact retrieving configuration content in accordance with an example embodiment.

FIG. 4 is a diagram illustrating activation information for configuration content in accordance with an alternative example embodiment.

Figure 1A:
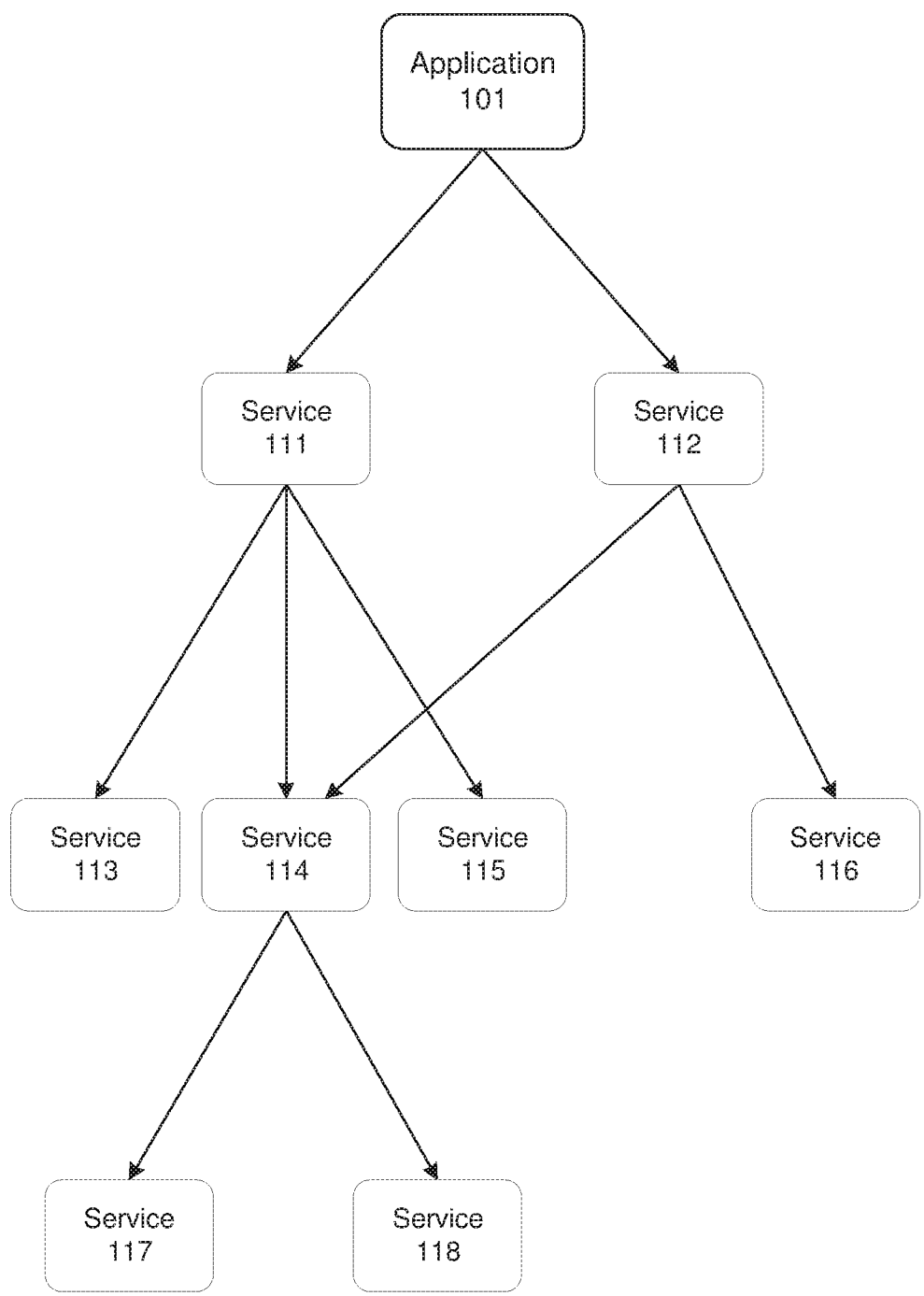
FIG. 1A is a diagram illustrating a microservices architecture in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

A microservices architecture enables a software application to be built as a group of modular components (services). Each service supports a specific/unique task or business goal of the application and uses a simple well-defined interface such as an application programming interface (API) to communicate with the other services. For example, each service may have its own database and can generate alerts, log data, support user interfaces (UIs), perform authentication and identification, and the like.

Microservices make it easier to test and deploy changes to the code. Because each service is separated from the others, fault isolation is also improved. If there is a problem in the software, the problematic service can be isolated, remediated, tested and redeployed without the need to regression test the entire application as with traditional monolithic application architectures. Further, microservices enhance business agility with faster software development and deployment compared to monolithic software architecture. However, microservices still require the same amount of services as a monolithic software product. Therefore, the management for a microservices architecture can be more complex given that each service is independent and not coupled to one another.

Microservices often rely on business objects, other services, software entities, code modules, and the like. For example, a business object can be used to model business behavior such as a business entity, person, place, etc. The business object may include a set of attributes and values, behaviors/operations, and relationships with other business objects. Properties within a business object may specify how a database can use and interact with a business object. The behavior may specify business logic of the business object. In addition, the business object may provide a user-friendly abstraction of table data that can be queried without requiring a developer to be familiar with a database schema. The business object may be integrated within a software application and work in conjunction with data access and business logic to transport data. Furthermore, a business object may include functionality for presenting the underlying data for view via a user interface, modifying the data, deleting the data, creating new data, and the like.

One example of a business object is a configuration object. The configuration object handles configuration data which can be integrated into different software such as applications, services, programs, and the like. A configuration object may include metadata describing the structure of a configuration such as the tables and the columns of each table with the data type (a configuration usually consists of more than one table). Meanwhile, the configuration content is the actual values of data that are stored in the tables described by the configuration object.

Different data such as countries, languages, currencies, and the like, which are accessed by multiple applications and/or services may have their own configuration objects. The configuration in these objects are used to influence processes that work on business objects that need to use countries, languages, currencies, etc. As a non-limiting example, an order process for a book can be configured to allow shipment addresses in a specific set of countries. The set of countries may be configured with the country configuration object including the values of content stored in the underlying tables. The billing process may behave differently when calculating the shipment price depending on the target country due to different shipment cost per country, etc.

For example, the country configuration object may provide ISO codes for different countries while the 2 letter or 3 letter values of the ISO codes represents the configuration content. This data may be accessed by the functions of the application and its corresponding microservices. Over time, the ISO codes within the configuration object titled "countries" may be changed by adding or deleting ISO codes. For example, the countries configuration object may initially include ISO codes for the United States (US), Germany (DE), and India (IN). At some point, the configuration object may be expanded to include the ISO code for Switzerland (CHE). The original version of the configuration object with three ISO codes and the modified version with four ISO codes may be referred to as different configuration content or different versions of the configuration of the countries configuration object.

Each software in the microservices architecture (e.g., applications, services, etc.) includes a local storage which may store configuration objects. Configuration objects may be pre-built into the software and may be provided from a host platform (e.g., cloud, database, etc.) where different third party software is executed.

Configuration objects are software artifacts that may include database models, OData services (the former two implemented in the CDS programming language), request handers written for example in Java, and user interfaces (UIs), e.g. built in Fiori, etc., and optional initial contents. The initial contents are a configuration, i.e. values for the tables. The configuration objects can be downloaded during build time of the application from a software repository. During the build, the configuration objects become part or the resulting application or service, which is then deployed in the cloud. During deployment time, the deployment mechanism creates the database tables based on the database models and fills them with the initial content. During the deployment generally only one version is provided, but also several versions of the configuration might be deployed as well. During runtime of the service/application more versions of the configuration might be added to the data base tables. An application may consume several configuration objects, each having its own respective set of versions of configurations.

A lifecycle of a configuration object may include a development phase where the elements of the configuration are developed (e.g., database model, OData service, request handlers, UI's, etc.) The lifecycle may also include a build phase where the elements are compiled by the respective compilers during a build process. The result is a software artifact (archive) which is referred to herein as a configuration object. The resulting configuration object is deployed to the software repository. In addition, the lifecycle may include a consumption phase during which the configuration object is consumed by an application and/or a service during a build time. In this phase, the configuration object may be read from the software repository and its elements may be integrated into the service/application source code and/or libraries.

Meanwhile, a lifecycle of a software (application, service, etc.) may include a development phase where the artifacts, such as source code, are created. In addition, the software may include a build phase during which the source code (and other artifacts, if appropriate) are compiled and a software artifact (archive) is created. During the build phase, the configuration objects that the application/service consumes are read from the software repository and integrated into the application/service source code. In addition, the software may include a deployment phase where the software archive of the service/application is deployed to a host platform such as a cloud environment, database tables, etc.

Here, the tables of the business objects integrated by the software including the configuration objects may be created and filled. As another example, if the application/service is working with a configuration repository, the application/service may register the configuration objects that it uses with configuration repository such that configuration repository knows which application/service to update with new versions of configuration. The software may also include a running phase where the application/service is running and it can access the configurations stored in the database tables that were created for the consumed configuration objects.

For the application to work properly in the micro services architecture, any updates in the configuration content represented by the configuration object must be synchronously available (i.e., at the same time) to all components/services of the application. However, this is traditionally not the case. Rather, the update is performed asynchronously such as in a round-robin approach during which the local database of each software service of the application is updated with the new/modified configuration data from the host platform. However, during this transition period, the application may continue to process data. Accordingly, if a configuration update has only reached some parts of the application, but not all parts (e.g., some services but not all services), errors may occur when executing the application.

To address this issue, the example embodiments introduce the concept of time-dependent versioning of configuration content for software. Rather than require each application, service, etc. to update its own configuration object on-the-fly, the system provides each service of a software application and the application itself with activation data (e.g., table, etc.) which stores different versions of the configuration object. The activation data enables a future version of the configuration object to be added to application ahead of time (i.e., prior to being activated). Here, the application (or service) may store the versioning information in a lookup table. Accordingly, each software that makes up a software application may receive an update to a configuration object ahead of time. Here, the configuration repository may provide the updates asynchronously, however, the update will be ahead of time and prior to the activation of the new version of the configuration of the software object. Software may include libraries, etc., which manage how the software reads activation data from the lookup table. In this case, the software may know to read the currently active version. Thus, when the activation time occurs, each of the software will have the current version of the configuration object without having to wait for an update.

FIG. 1A illustrates a microservices architecture 100A in accordance with an example embodiment. For example, the microservices architecture 100A may be implemented within a cloud computing environment (e.g., Cloud Foundry, etc.) which is based on a microservices architecture. Referring to FIG. 1A, an application 101 is built with a plurality of modular components (i.e., services 111-118) which implement the functionality of the application 101. Here, the different services 111-118 perform different/unique functions and collaborate together to perform application tasks for the application 101. Also, the different services 111-118 may be provided independently of the application 101 and may perform tasks for other applications which are not shown. As described herein, the application 101 and the services 111-118 may be generally referred to as software artifacts.

In the example of FIG. 1A, the different services 111-118 are shown in a hierarchical graph. However, it should be appreciated that the services 111-118 may also interact with one another. For example, a service from among the different services 111-118 can call another one of the services from among the different services 111-118, creating a cascading effect. Therefore, instead of a hierarchical graph, as another example, the services 111-118 may be represented with a direct graph.

In the example of the microservices architecture 100A of FIG. 1A, the application 101 functionality is distributed across the different services 111-118. In other words, the application 101 consumes the services 111-118 to provide functionality for the application 101. The application 101 and each of the services 111-118 may have their own storage such as a database, a cache, etc. which can be used to hold configuration objects and configuration content therein.

For example, the application 101 may be a sales order application that consumes a pricing service and a business partner service. Here, a customer may use the sales order application to conduct business in the US, Germany, and India. To work properly, the sales order application and the corresponding services must be configured with the same set of countries. As one example, the country data may be stored in a countries configuration object and content of the configuration may be stored in a table, etc. The countries object may then be recorded within the local storages of the application and the services.

In this example, the customer may want to extend the business operations to a fourth country, Switzerland. Traditional approaches for updating the local countries configuration object held by each of the application and the services is to perform a round-robin asynchronous update from the host platform. However, this process results in a delay between when a first component is updated with the new configuration and a last component is updated with the new configuration.

Figure 1B:
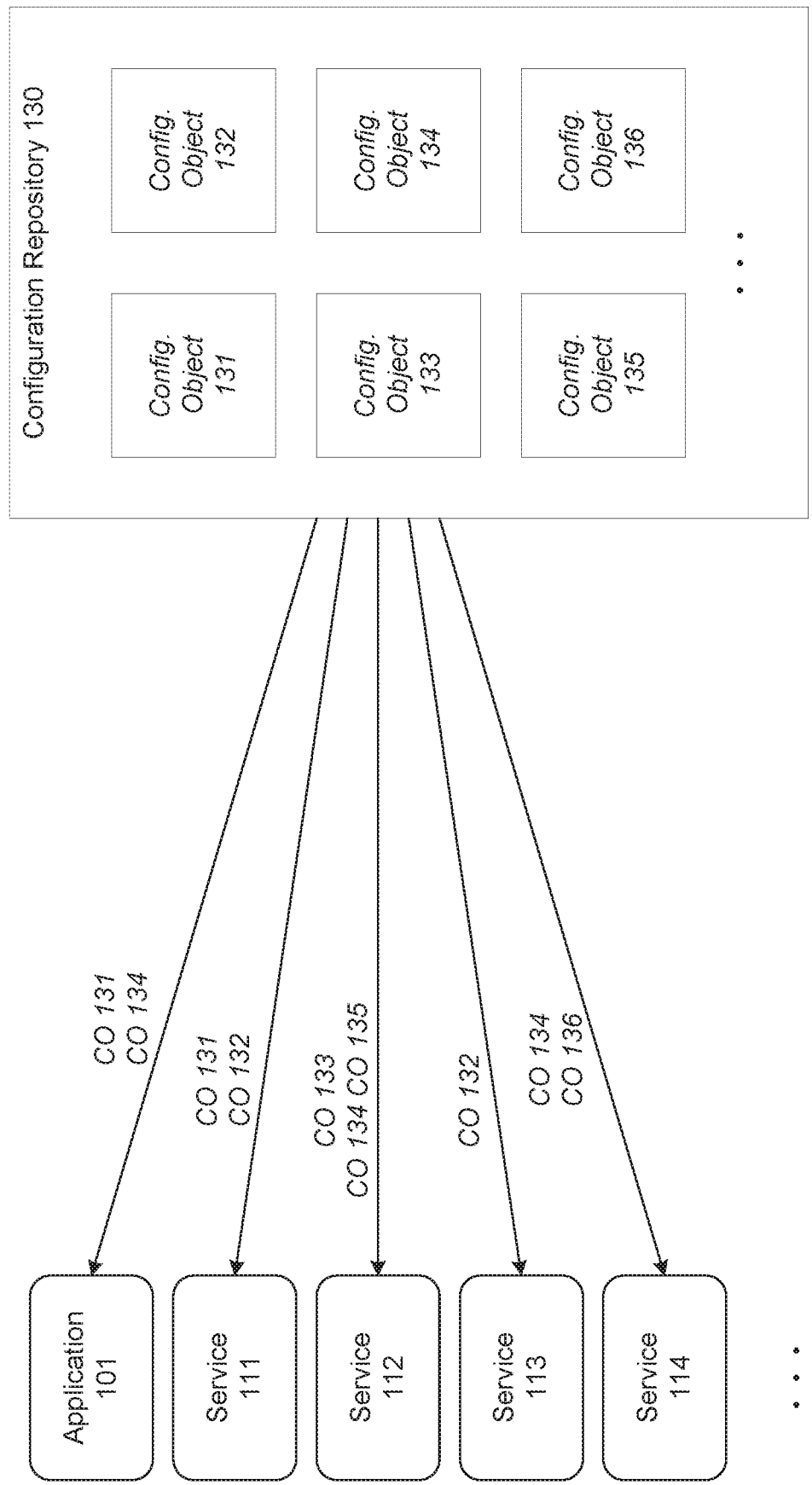
FIG. 1B is a diagram illustrating a computing environment for time-dependent content configuration in accordance with an example embodiment.

FIG. 1B illustrates a computing environment 100B for time-dependent content configuration in accordance with an example embodiment. Referring to FIG. 1B, the environment 110B may include a configuration repository 130 which stores time-dependent configuration data including configuration objects 131-136, which can receive requests and provide updated configuration object and configuration content to the application 101 and the services 111-118 shown in FIG. 1A, and which can provide time-dependent versions of configuration data for objects to be used. As one example, each of the application 101 and the services 111-118 may register with the configuration repository 130 during an initialization phase, etc. Here, the application and the services 111-118 may inform the configuration repository 130 of the configuration objects associated with each. In this example, the application 101 has built therein configuration objects 131 and 134, while service 111 has built therein configuration objects 131 and 132.

In the example above with the countries configuration object, the initial set of countries includes the US, Germany, and India. In this case, the initial set may be referred to as configuration version 1.0.0. When the customer desires to update the configuration of the countries configuration object to include a fourth country (Switzerland), the new configuration includes four countries, US, Germany, India, and Switzerland, and may be referred to as version 1.1.0 of the countries configuration object. The configuration repository 130 may store different versions of the configuration objects 131-136, and distribute it consistently to each of the application 101 and the different services 111-118. As further described in the examples below, the configuration repository 130 may store version identifiers which distinguish different versions of a configuration object from one another, and activation times when the versions are active. The version information can be read by local services of the application 101 and the services 111-118 which is further described with respect to FIG. 3.

For example, the configuration repository 130 may know which configuration objects are used by each of the application 101 and the services 111-1118 and may automatically provide updated versioning information to the application 101 and the services 111-118 when it is received and ahead of time (prior to implementation of the updated version). As another example, the application 101 and the services 111-118 may periodically request version information from the configuration repository 130 via an application programming interface (API) call of the configuration repository 130.

In the example of FIG. 1B, the configuration repository 130 knows which application/service uses configuration objects 131-136 stored in the configuration repository 130 and which are associated with a request from the application 101. Accordingly, the configuration repository 130 can distribute the configurations in a focused manner. In some embodiments, the configuration repository 130 may broadcast configurations enabling each of the application 101 and the services 111-118 to receive updates to all configuration objects 131-136 and pick which updates it needs to follow. In another example, the application 101 and the services 111-118 may independently/individually pull the configuration objects needed from the configuration repository 130 on a periodic basis.

According to various aspects, the example embodiments store a version identifier of a new configuration of content and an activity date of the version. This identifies when the configuration is good/active. In some cases, each entry may include only an active from date and time. As another example, each entry may include both an active from date and time and an active to date and time. Furthermore, this allows the configuration to be stored ahead of time in the system before the activity date by labeling it with a new version label. Because the activity data has not been reached, it is not used by the application/services. As soon as the activity date is reached, all application/services activate the configuration at the same time removing any potential errors caused by contrasting content versions. In this case, the configuration repository 130 may update the application services in an asynchronous fashion. However, because the system updates the version ahead of time with some time to spare and an activation date has not yet been implemented, the change can be stored ahead of time and then implemented at the same time when the activation data occurs.

FIGS. 2A-2B illustrate activation information for configuration content in accordance with an example embodiment. For example, the activation information may be stored in a lookup table of a software artifact (application or service, etc.) Referring to FIG. 2A, a lookup table 200 stores version information 202 of a group of software objects, such as business objects in a database. In this example, the objects Countries, Currencies, and Pricing each include multiple versions as identified by the version identifiers 202. The lookup table 200 further includes a name of the object 206, and an activation time 208. The activation time 208 may include an activation start time as shown in the example of FIG. 2A. Here, a software artifact which includes the lookup table 200 may know which version is active by reading activation from times of all versions. For example, the software artifact may read the activation start times of each version of an object to detect when a first version ends and a next version begins. As another example, the activation time 208 may include both a start time and an end time (e.g., Active From and Active To, etc.).

As described above, the configuration repository 130 keeps track of versions of configuration descriptions, as well as versions of configuration data. The versions stored in the lookup table 200 may be provided from the configuration repository 130 shown in FIG. 1. Therefore, each application/service may build its own copy of the lookup table 200 as it receives new/different versions of the configuration objects pre-built into the respective application/service.

The lookup table 200 provides the version information of a configuration for an object. Meanwhile, configuration objects (COs) describe the structure of configurations associated with each version, while configuration contents (CCs) define the actual configuration data associated with each version. For example, a configuration object for Countries lists the attributes (configuration content) that are required per country, such as a two-letter ISO code and the country name in English. Provided below is an example of the countries configuration object expressed in JSON schema:

---
Example 1: Schema for a Countries Configuration Object
---

```
{
    "$id": "https://example.com/person.schema.json",
    "$schema": "http://json-schema.org/draft-07/schema#",
    "title": "Country",
    "type": "object",
    "properties": {
        "IsoCode": {
            "type": "string",
            "minLength": 2,
            "maxLength": 2,
            "description": "The country's two-character ISO code."
        },
        "name": {
            "type": "string",
            "description": "The country's name in English."
        }
    }
}
```

Meanwhile, the configuration content for the countries Germany, India and the US, can be formulated in JSON as follows:

---
Example 2: Configuration Contents for a Countries Configuration Object
---

```
[
    { "IsoCode": "DE", "name": "Germany" },
    { "IsoCode": "IN", "name": "India" },
    { "IsoCode": "US", "name": "United States of America" }
]
```

In the example of FIG. 2A, a current time is Jul. 2, 2019 @ 2 pm. When an application or service stores the versions information shown in FIG. 2A, it can determine that the current versions of the three objects Countries, Currencies, and Pricing is versions 1.0.1, 1.0.0, and 2.1.0, based on a current time (e.g., from a system clock) compared to the activation time 208 stored in the lookup table 200. The result is the active version table 210 shown in FIG. 2A.

In some examples, a configuration pattern (CP) may be the simplest kind of configuration object. The CP may model a set of entities, which consist of a set of properties. As an example, a CP may be implemented by a set of database tables with each property of the CP reflected as a column in the table. Example 1 above is an example of a CP for a Countries object. The respective configuration content for the Countries CP is shown in Example 2 above.

Configuration objects may change over time. For example, new properties may be added to entities. These changes may occur initially in the configuration repository. Accordingly, configuration objects stored locally by the different software artifacts need to change as well. To distinguish between the individual formats, the configuration objects and the configuration contents contain a version field. As a non-limiting example, the version identifier may be based on the pattern Major.minor.patch, (e.g., a string "1.1.0" or the like). The version may be presented in this format within a user interface such as shown in the version identifier 202 in FIG. 2A and the version identifier 222 in FIG. 2B. For efficient handling, however, the version may be internally represented as integer value.

Example 3 below illustrates the Countries configuration object of Example 1 which is extended by the three letter ISO code. The example 3 below corresponds to version 2.0.0 of the Countries configuration object. As described, the configuration objects may have both a version field and a version property. The version field stores the version of the configuration object. The version property may define the version field for the related CC.

---
Example 3: Schema for an extended Countries Configuration Object
---

```
{
    "$id": "https://example.com/person.schema.json",
    "$schema": "http://json-schema.org/draft-07/schema#",
    "title": "Countries",
    "type": "object",
    "version": "8589934592",
    "properties": {
        "Version": {
            "type": "integer",
            "minimum": 4294967296,
            "maximum": 140735340838911,
            "description": "Version encoded in binary."
        },
        "IsoCode": {
            "type": "string",
            "minLength": 2,
            "maxLength": 2,
            "description": "The country's two-character ISO code."
        },
        "IsoCode3": {
            "type": "string",
            "minLength": 3,
            "maxLength": 3,
            "description": "The country's three-character ISO code."
        },
```

-continued

Example 3: Schema for an extended
Countries Configuration Object

```
        "name": {
            "type": "string",
            "description": "The country's name in English."
        }
    }
}
```

Creating a new version of a configuration object may include generating a new version of the related configuration content. As seen in Example 3, the new fields IsoCode3 needs content values. Example 4 listed below shows what the CC version 2.0.0 for the CO version 2.0.0 might look like:

Example 4: Configuration Contents for a Countries
Configuration Object version 2.0.0

```
[
    { "Version": "8589934592", "IsoCode": "CH", "name": "Switzerland" },
    { "Version": "8589934592", "IsoCode": "DE", "name": "Germany" },
    { "Version": "8589934592", "IsoCode": "IN", "name": "India" },
    { "Version": "8589934592", "IsoCode": "US", "name": "United States of America" }
]
```

In some embodiments, there can only be one configuration object or configuration content with a specific version, as versions are unique. In addition, a version of a configuration object is always complete, which means that it contains all entities of the version. To add entities to or remove entities from a specific version of a configuration object, a new version must be defined. In addition, only one configuration object version is valid at a specific point in time. In the example of FIG. 2A, the lookup table 200 contains, for each object, its version 202, name 206, and an activation field called "activeFrom". The "activeFrom" field may be in date/time format. Its value defines the point in time from which this particular version of the configuration content is active. If more than one configuration content is active at the same time, the one with the highest version wins.

FIG. 2B illustrates another example of a lookup table 220 in accordance with an example embodiment, as well as a content table 230 for a sales channel business object in the lookup table 220. The lookup table 220 includes a version field 222, a name field 226, and an activation time 228. In the example of FIG. 2B, a current time is May 2, 2019 (i.e., 2.5.2019) and the time is 2 pm (i.e., 14:00). Accordingly, the application or service may identify that a current version of the Sales Channel object is version 1.1.0 based on an Active From field 228 of the lookup table 200. Furthermore, the system may then refer to the content table 230 to retrieve particular functions of the Sales Channel object that are currently active in version 1.1.0 based on a version identifier 232 in the content table 230.

FIG. 3 illustrates a process 300 of a software artifact 310 retrieving configuration content in accordance with an example embodiment. In this example, the software artifact 310 is an application, but it may be a service, etc. In this example, the application 310 may install a library 312 from the configuration repository which enables the application 310 to manage communications with the configuration repository 330 (and an application programming interface 332) of the configuration repository 330. In addition, the application 310 includes a lookup table 314 which stores activation data of configuration objects that are used by the application 310.

In the example of FIG. 3, the application 310 has a single configuration object 320. However, it should be appreciated that the application 310 may have multiple configuration objects which each include a similar architecture as the configuration object 320. In addition, the lookup table 314 may store activation data (version information) for all configuration objects of the application 310. The application 310 may consume the library 312 from the configuration repository. The library 312 may provide communication protocols between the application 310 and the configuration repository 330. The configuration repository 330 may provide the activity data to the lookup table 314 which is stored by the application 310 (e.g., application memory, etc.), and the configuration content which is stored by the configuration object 320. Here, the library 312 is what allows the application 310 to manage the data from the configuration repository 330.

The configuration object 320 includes a model 326 which is compiled during the build phase. During deployment, database tables are created based on the model 326. Furthermore, the configuration object 320 includes a service 324 which may create, read, update, and delete the data stored based on the model 326. Furthermore, the configuration object 320 may include a view or user interface 322 component which can display underlying data (table data, etc.) associated with the configuration object 320 to a user via a screen or display. The configuration content associated with the configuration object 320 may be received from the configuration repository 330 and stored based on the model 326. Meanwhile, the version information of the configuration object 320 may be received from the configuration repository 330 and stored in the lookup table 314 of the application 310.

When an application 310 detects a request for configuration information of the configuration object 320 from a process that is executed therein, the service 324 may read a version of the configuration object 320 from the lookup table 314, and also read the configuration content of the corresponding version based on the model 326. This information may be passed to the process for execution.

Meanwhile, when the application 310 is first stored, executed, etc., on the underlying host system, the application 310 may register its configuration objects (including configuration object 320) with the configuration repository 330. When an update the configuration object 320 is performed, the configuration repository 330 may automatically provide the update to the configuration object 320 locally stored on the application 310. This can be performed for all software artifacts that include the same configuration object 320. Accordingly, all software artifacts which use the configuration object 320 may read the correct active version of the configuration object 320 when the time comes. The service 324 of the configuration object 320 that reads the configuration respects the time. It looks and makes a database selection and captures the currently active version.

In the example of FIGS. 2A and 2B, the use of "active from" without the use of an express indication of when the active period of a version ends prevents gaps in the active time of the configuration object. The implicit assumption of the active from mechanism is that a configuration once active is active for eternity. On the other hand, overlaps in activity time of two versions are not supported. As soon as a new version becomes active, the older version is automatically deactivated.

FIG. 4 illustrates another example of a lookup table which uses both an active from (valid from) and an active to (valid to) fields, in accordance with an alternative embodiment. In this example, the activation information 400 includes a version field 401, the local value field 404, a rebate field 405, and description field 406. In addition, the activation information 400 includes a valid from field 402 and a valid to field 403, thereby defining both a start and an end time, respectively, for the version of the object. In this example, version 1.0.0 defines the prices for the year 2017. In this case, there is a laptop sale for the second half of the year and monitor prices are planned to be constant over the year. Meanwhile, version 2.0.0 defines the prices for the year 2018. In this version there is a laptop summer sale planned for June to August while monitor prices are planned to be constant over the year. Further, version 2.1.0 defines an unexpected change in laptop prices in the year 2018 due to a production shortage. Depending on whether the object is associated with a laptop or a monitor, the version information will be different.

Figure 5:
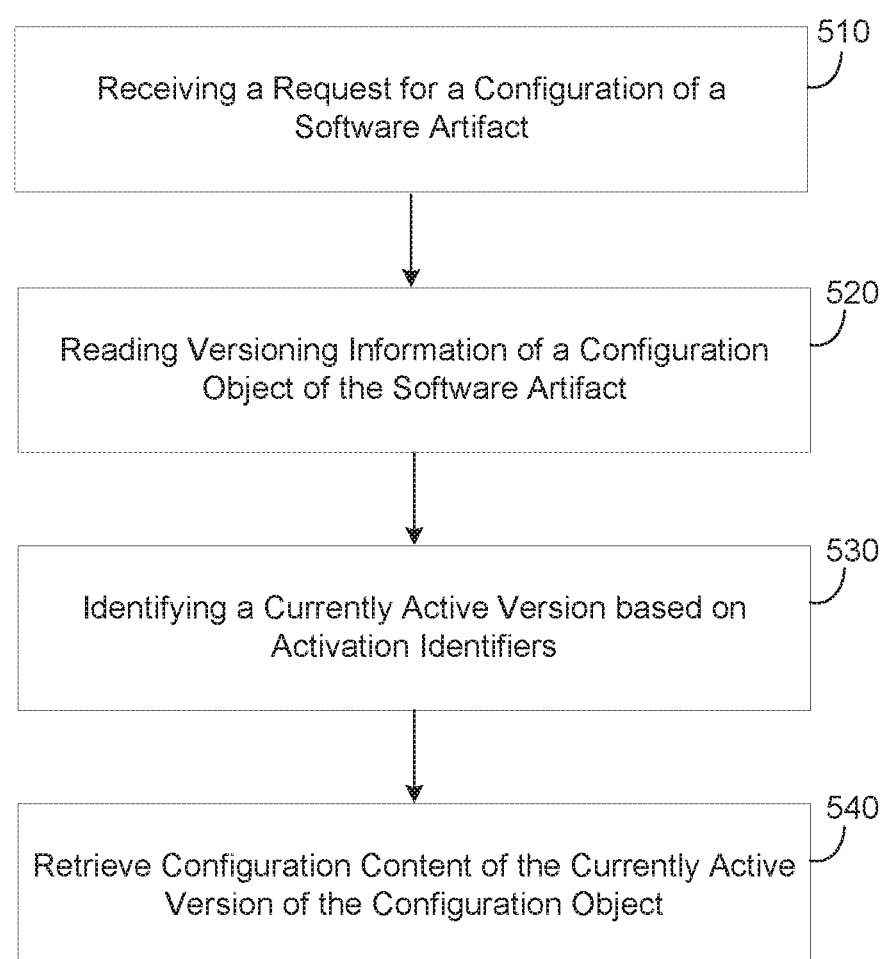
FIG. 5 is a diagram illustrating a method of identifying active configuration content in accordance with an example embodiment.

FIG. 5 illustrates a method 500 of identifying active configuration content in accordance with an example embodiment. For example, the method 500 may be performed by a software artifact such as an application, a service, or other program that is executing on a database node, a cloud platform, a server, a computing system (user device), a combination of devices/nodes, or the like. Referring to FIG. 5, in 510, the method may include receiving a request associated with a software artifact. For example, the request may be from a process that is executed by the software artifact.

In 520, the method may include reading version information of a configuration object of the software artifact associated with the request. For example, the version information may include different versions corresponding to different configuration content of the configuration object. Here, the versions may be distinguished from one another based on version identifiers as well as activation times/dates which identify when the version is to be used and when it is not to be used. Each version may implement different configuration content to be used by the processes of the software artifact. For example, a change may increase or decrease the data attributes stored by the software artifact, increase or decrease the operations performed by the software artifact, change, add, or delete values, change, add, or delete names, and the like.

In some embodiments, the reading may include reading version information of the configuration object which is shared among a plurality of software artifacts in a microservices architecture. The version information may be stored in a lookup table of the software artifact and may be updated with content changes from a global configuration repository. Here, the global version information may be applicable to all software artifacts that subscribe to the configuration object. For example, the reading may include reading a table (rows, columns, etc.) of version entries from the configuration repository may include a version identifier and an activation time for a respective version of the configuration object.

In 530, the method may include identifying a currently active version of the configuration object from among the different versions based on activation identifiers of the different versions, and in 540, the method may include retrieving configuration content of the currently active version of the configuration object. For example, the configuration content may be stored locally by the software artifact and may include attributes, channels, values, and the like, which may be updated by the configuration repository over time. In some embodiments, the identifying may include determining the currently active version of the configuration object from among the plurality of different versions based on a version that has an activation time that overlaps with a present time.

In some embodiments, the identifying may include identifying at least two versions of the configuration object that include activation data indicating the versions are active, and selecting a version from among the at least two versions as the currently active version based on respective version identifiers of the at least two versions. In some embodiments, the identifying may further include identifying a version among the different versions which is currently an active version for a first property from among a plurality of different properties of the configuration object based on activation data for the different versions and the different data attributes.

Although not shown in FIG. 5, the method may further include determining the configuration content from a configuration content table based on an identifier of the currently active version of the configuration object. Here, the configuration content may be stored in a table that also includes version identifiers and a list of content associated with the different version identifiers, or the like. In this example, the determining may include identifying one or more configuration attributes that are active in response to version identifiers of the one or more configuration attributes matching a version identifier of the currently active version of the configuration object. In some embodiments, the method may include retrieving the version information from a configuration repository and storing it in a local cache of the software artifact.

Figure 6:
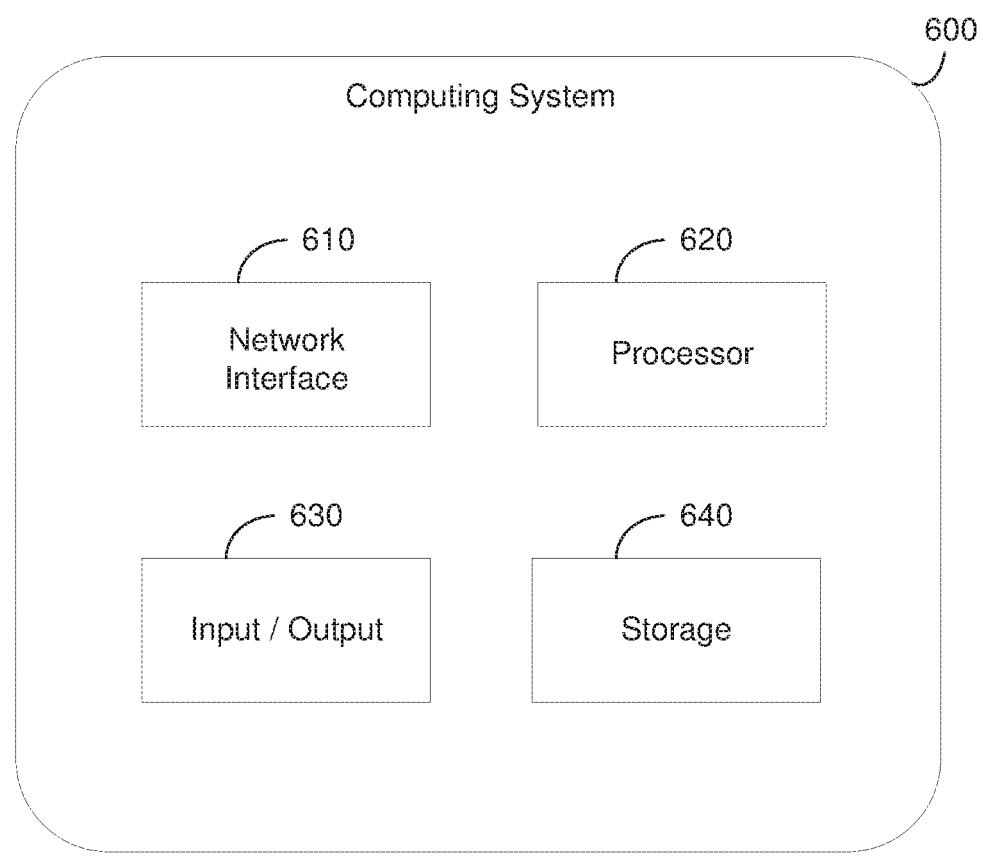
FIG. 6 is a diagram illustrating a computing system for use in the examples herein in accordance with an example embodiment.

FIG. 6 illustrates a computing system 600 that may be used in any of the methods and processes described herein, in accordance with an example embodiment. For example, the computing system 600 may be a database node, a server, a cloud platform, or the like. In some embodiments, the computing system 600 may be distributed across multiple computing devices such as multiple database nodes. Referring to FIG. 6, the computing system 600 includes a network interface 610, a processor 620, an input/output 630, and a storage device 640 such as an in-memory storage, and the like. Although not shown in FIG. 6, the computing system 600 may also include or be electronically connected to other components such as a display, an input unit(s), a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The input/output 630 may include an interface, a port, a cable, a bus, a board, a wire, and the like, for inputting and outputting data to and from the computing system 600. For example, data may be output to an embedded display of the computing system 600, an externally connected display, a display connected to the cloud, another device, and the like. The network interface 610, the input/output 630, the storage 640, or a combination thereof, may interact with applications executing on other devices.

The storage device 640 is not limited to a particular storage device and may include any known memory device such as RAM, ROM, hard disk, and the like, and may or may not be included within a database system, a cloud environment, a web server, or the like. The storage 640 may store software modules or other instructions which can be executed by the processor 620 to perform the method shown in FIG. 4. According to various embodiments, the storage 640 may include a data store having a plurality of tables, partitions and sub-partitions. The storage 640 may be used to store database records, items, entries, and the like. In some embodiments, the storage 640 may be configured to store instructions for managing a configuration repository for a distributed system.

According to various embodiments, the storage 640 may store a request associated with a software artifact such as a service, an application, a program, and the like. For example, the request may be a request for configuration data of a configuration object that is used locally by processes of the software artifact. In response, the processor 620 may read version information of the configuration object from activation data that is stored on the software artifact and the is provided and managed globally from a configuration repository. Here, the version information may include different versions corresponding to different configuration content of the configuration object. Each version may include an identifier of its activation time (e.g., when it starts, when it ends, etc.)

Furthermore, the processor 620 may identify a currently active version of the configuration object from among the different versions based on activation identifiers of the different versions. Furthermore, the processor 620 may retrieve configuration content of the currently active version of the configuration object. Here, the software artifact may include a cache or other storage which stores database data including configuration content to be used by the processes of the software artifact. In some embodiments, the processor 620 may retrieve configuration content from the configuration repository, the database, or the like, and store different versions of configuration content corresponding to different versions of the configuration object.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a processor configured to
receive a request for a table data item from a process of a software application,
identify a configuration object integrated into the software application and comprising information for modifying the table data item,
read version information of the configuration object from a first column of an activation data structure comprising different versions corresponding to different configuration content of the configuration object and activation values in date and time format from a second column of the activation data structure which is paired with the first column,
determine that a new version of the configuration object is active based on a comparison of an activation value in date and time format of the new version read from the second column to a current time value of a system clock,
activate the new version of the configuration object comprising updated configuration content of the table data item, and
output the updated configuration content of the table data item corresponding to the new version of the configuration object to the process.

2. The computing system of claim 1, wherein the processor is further configured to integrate code of the configuration object into one or more of source code of the software application and a software library of the software application, prior to receiving the request for the table data item.

3. The computing system of claim 1, wherein the processor is configured to read the different versions from entries in an activation table, where each entry comprises a version identifier in the first column and an active from value in date and time format for a respective version of the configuration object in the second column.

4. The computing system of claim 3, wherein the processor is configured to determine to activate the new version of the configuration object from among the different versions based on a version that has an active from value in date and time format in the second column of the activation table that overlaps with a present time of the system clock of the computing system.

5. The computing system of claim 1, wherein the processor is further configured to determine the different configuration content from a configuration content table of the configuration object based on an identifier of the new version of the configuration object.

6. The computing system of claim 1, wherein the configuration object comprises a model for storing table content and a service for performing one or more of create, read, update, and delete operations on the table content.

7. The computing system of claim 1, wherein the processor is configured to identify at least two versions of the configuration object that comprise activation data indicating the versions are active, and select a version from among the at least two versions as a currently active version based on respective version identifiers of the at least two versions.

8. The computing system of claim 1, wherein the processor is configured to identify a version among the different versions which is currently an active version for a first property from among a plurality of different properties of the configuration object based on activation data for the different versions and the different properties.

9. The computing system of claim 1, wherein the processor is further configured to register the software application for updates to the configuration object with a host platform that hosts the configuration object.

10. The computing system of claim 9, wherein the processor is further configured to receive the updates to the configuration object via one or more of a push mechanism in which the host platform automatically pushes the updates to the configuration object to the software application and a pull mechanism in which the software application requests the updates to the configuration object from the host platform.

11. A method comprising:
receiving a request for a table data item from a process of a software application;
identifying a configuration object integrated into the software application and comprising information for modifying the table data item;
reading version information of the configuration object from a first column of an activation data structure comprising different versions corresponding to different configuration content of the configuration object and activation values in date and time format from a second column of the activation data structure which is paired with the first column;
determining that a new version of the configuration object is active based on a comparison of an activation value in date and time format of the new version read from the second column to a current time value of a system clock;
activating the new version of the configuration object comprising updated configuration content of the table data item; and
outputting the updated configuration content of the table data item corresponding to the new version of the configuration object.

12. The method of claim 11, wherein the method further comprises integrating code of the configuration object into one or more of source code of the software application and a software library of the software application, prior to receiving the request for the table data item.

13. The method of claim 11, wherein the reading comprises reading the different versions from entries in an activation table, where each entry comprises a version identifier in the first column and an active from value in date and time format for a respective version of the configuration object in the second column.

14. The method of claim 13, wherein the activating comprises determining to activate the new version of the configuration object from among the different versions based on a version that has an active from value in date and time format in the second column of the activation table that overlaps with a present time of the system clock of a computing system.

15. The method of claim 11, further comprising determining the different configuration content from a configuration content table of the configuration object based on an identifier of the new version of the configuration object.

16. The method of claim 11, wherein the configuration object comprises a model for storing table content and a service for performing one or more of create, read, update, and delete operations on the table content.

17. The method of claim 11, wherein the identifying comprises identifying at least two versions of the configuration object that comprise activation data indicating the versions are active, and selecting a version from among the at least two versions as a currently active version based on respective version identifiers of the at least two versions.

18. The method of claim 11, wherein the identifying further comprises identifying a version among the different versions which is currently an active version for a first property from among a plurality of different properties of the configuration object based on activation data for the different versions and the different properties.

19. A non-transitory computer-readable medium storing instructions which when executed by a processor cause a computer to perform a method comprising:
receiving a request for a table data item from a process of a software application;
identifying a configuration object integrated into the software application and comprising information for modifying the table data item;
reading version information of the configuration object from a first column of an activation data structure comprising different versions corresponding to different configuration content of the configuration object and activation values in date and time format from a second column of the activation data structure which is paired with the first column;
determining that a new version of the configuration object is active based on a comparison of an activation value in date and time format of the new version read from the second column to a current time value of a system clock;
activating the new version of the configuration object comprising updated configuration content of the table data item; and
outputting the updated configuration content of the table data item corresponding to the new version of the configuration object to the process.

20. The non-transitory computer-readable medium of claim 19, wherein the method further comprises integrating code of the configuration object into one or more of source code of the software application and a software library of the software application, prior to receiving the request for the table data item.

21. The non-transitory computer-readable medium of claim 19, wherein the reading comprises reading the different versions from entries in an activation table, where each entry comprises a version identifier in the first column and an active from value in date and time format for a respective version of the configuration object in the second column.

22. The non-transitory computer-readable medium of claim 21, wherein the activating comprises determining to activate the new version of the configuration object from among the different versions based on a version that has an active from value in date and time format in the second column of the activation table that overlaps with a present time of a system clock.

* * * * *